US006486770B2

(12) United States Patent
Tan et al.

(10) Patent No.: US 6,486,770 B2
(45) Date of Patent: Nov. 26, 2002

(54) IMPEDANCE MATCHING CIRCUIT FOR SWITCHED ALTERNATING CURRENT POWER SUPPLIES

(75) Inventors: Koh Hock Tan, Singapore (SG); Kay Keow Quincey Poon, Singapore (SG); King Pok Lee, Singapore (SG); Kheng Joo Yeo, Singapore (SG); See Tee Tan, Singapore (SG)

(73) Assignee: Singapore Technologies Electronics, Ltd. (SG)

( * ) Notice: Subject to any disclaimer, the term of this patent is extended or adjusted under 35 U.S.C. 154(b) by 0 days.

(21) Appl. No.: 09/839,811

(22) Filed: Apr. 19, 2001

(65) Prior Publication Data

US 2002/0154001 A1 Oct. 24, 2002

(51) Int. Cl.$^7$ .............................................. H04M 11/04

(52) U.S. Cl. ............................... 340/310.05; 340/815.4

(58) Field of Search ......................... 340/310.05, 815.4; 345/46, 82

(56) References Cited

U.S. PATENT DOCUMENTS

| | | | | | |
|---|---|---|---|---|---|
| 3,551,653 | A | * | 12/1970 | Yanagisawa et al. | 235/92 |
| 4,141,000 | A | * | 2/1979 | Thomas et al. | 340/752 |
| 6,107,986 | A | * | 8/2000 | Kennard et al. | 345/141 |

* cited by examiner

*Primary Examiner*—John Tweel
(74) *Attorney, Agent, or Firm*—Schwabe, Williamson and Wyatt, P.C.

(57) ABSTRACT

A traffic light system (10) with an impedance matching circuit (14) for electrically coupling an optical assembly (12) to a switched AC power supply (26) is described. The impedance matching circuit (14) has a matching transformer (20), a first resistor chain (22) and a second resistor chain (24). Each resistor chain (22,24) has an input and an output. Each of the inputs is common with a respective electrical node of the matching transformer (20). Each of the outputs is common with a respective supply node provided by the primary windings (18*a*) of an input transformer (18) of the optical assembly (12).

17 Claims, 2 Drawing Sheets

IMPEDANCE MATCHING CIRCUIT FOR SWITCHED ALTERNATING CURRENT POWER SUPPLIES

FIELD OF THE INVENTION

The present invention relates to impedance matching circuits for switched alternating current (AC) power supplies. In particular, this invention relates to an impedance matching circuit having an inductive input impedance for matching switched AC power supplies to electronic lighting elements such as, for example, LED optical assemblies of traffic light systems.

BACKGROUND OF THE INVENTION

Traffic light systems using electronic lighting elements such as light emitting diodes (LEDs) provide advantages of lower costs, energy savings, better overall brightness and reliability compared with electrical lighting elements such as incandescent lamps or halogen bulbs. The LEDs used in such traffic light systems are typically arrayed to provide light signals at desired colors. Each array of LEDs is commonly referred to as an optical assembly.

Electrical AC power to the different lighting elements or optical assemblies of a set of traffic lights is typically provided with an alternating current (AC) power source. The AC power is switched to each of the different lighting elements or optical assemblies by a controller. Such switching enables the different traffic light signals to be provided as desired. The AC power is then rectified with a transformer to provide direct current (DC) power.

The electrical power required by electronic lighting elements is typically lower than that for electrical lighting elements. Consequently, transformers for electronic lighting elements require more primary windings to step down the AC power to desired DC levels. Furthermore, as electronic components are generally more temperature sensitive than electrical components, such transformers should preferably be efficient to minimize heat generation.

For an efficient transformer, less heat is dissipated through its coils compared with less efficient or lossy transformers. Hence, unused AC power during the return power is typically reflected back to the AC power source. However for a triac switched AC power source during periods of non-conduction, the reflected AC power is not absorbed or sunk but is reflected back. This is because of the high impedance of the triac during such non-conduction periods. The reflection of the AC power by the triac switched AC power source at zero-crossings of an AC power cycle is a known problem that causes distortion of the AC power cycle. A power cycle of a triac switched AC power source is illustrated in the waveform of FIG. 1 with two zero-crossing distortions 8*a*,8*b* indicated.

Distortion of the AC power cycle results in a non-symmetrical AC waveform that has a net DC component. Such a net DC component is known to cause undesired heat dissipation in AC transformers and damage components such as, for example, fuses of the optical assemblies. Therefore, a need clearly exists for traffic light systems having electronic lighting elements to operate reliably with triac switched AC power supplies.

BRIEF SUMMARY OF THE INVENTION

The present invention seeks to provide an impedance matching circuit, an optical assembly having the impedance matching circuit and a traffic light system that comprises at least one of the optical assembly.

Accordingly, in one aspect, the present invention provides an impedance matching circuit for matching a switched alternating-current (AC) power supply to an optical assembly, the impedance matching circuit comprising:

- at least one matching transformer electrically coupled to the switched AC power supply;
- a first resistor chain comprising at least one resistor connected in series and having an input and an output, the input being common with an electrical node of the matching transformer, the output being common with a supply node of the optical assembly; and
- a second resistor chain comprising at least one resistor connected in series and having an input and an output, the input being common with another electrical node of the matching transformer, the output being common with another supply node of the optical assembly.

In another aspect, the present invention provides an optical assembly for traffic light signaling, the optical assembly comprising:

- a plurality of lighting elements;
- an input transformer having primary windings and secondary windings, the secondary windings being electrically coupled to the plurality of lighting elements; and
- an impedance matching circuit electrically coupled to the input transformer, the impedance matching circuit comprising:
  - at least one matching transformer;
  - a first resistor chain comprising at least one resistor connected in series and having an input and an output, the input being common with an electrical node of the matching transformer, the output being common with a supply node of the primary windings; and
  - a second resistor chain comprising at least one resistor connected in series and having an input and an output, the input being common with another electrical node of the matching transformer, the output being common with another supply node of the primary windings.

In a further aspect, the present invention provides a traffic light system to provide traffic light signals, the traffic light system comprising:

- at least one optical assembly comprising:
  - a plurality of lighting elements; and
  - an input transformer having primary windings and secondary windings, the secondary windings being electrically coupled to the plurality of lighting elements; and
- at least one impedance matching circuit electrically coupled to the optical assembly, each of the impedance matching circuit comprising:
  - at least one matching transformer;
  - a first resistor chain comprising at least one resistor connected in series and having an input and an output, the input being common with an electrical node of the matching transformer, the output being common with a supply node of the primary windings; and
  - a second resistor chain comprising at least one resistor connected in series and having an input and an output, the input being common with another electrical node of the matching transformer, the output being common with another supply node of the primary windings.

BRIEF DESCRIPTION OF THE DRAWINGS

Preferred embodiments of the present invention will now be more fully described, by way of example, with reference to the drawings of which.

DETAILED DESCRIPTION OF THE DRAWINGS

An impedance matching circuit, an optical assembly having the impedance matching circuit and a traffic light system that comprises at least one of the optical assembly in accordance with preferred embodiments of the invention are described. In the following description, details are provided to describe the preferred embodiments. It shall be apparent to one skilled in the art, however, that the invention may be practiced without such details. Some of these details may not be described at length so as not to obscure the invention.

There are many advantages of the preferred embodiments of the invention. One advantage of the preferred embodiments is that the impedance matching circuit can be incorporated into optical assemblies that are operable with different types of switched AC power supplies including relay-switched AC power supplies or solid state switched AC power supplies that use thyristors, particularly triacs. Hence, the impedance matching circuit is independent of the type of controllers being used in a traffic light system.

A further advantage of the preferred embodiments of the invention is that the impedance matching circuit can sink AC power that is reflected from a load. Hence, distortion of power cycles of triac switched AC power sources that are used with high efficiency transformers is eliminated or at least alleviated. This therefore enables triac switched AC power sources to supply power to electronic lighting elements.

Figure 1:
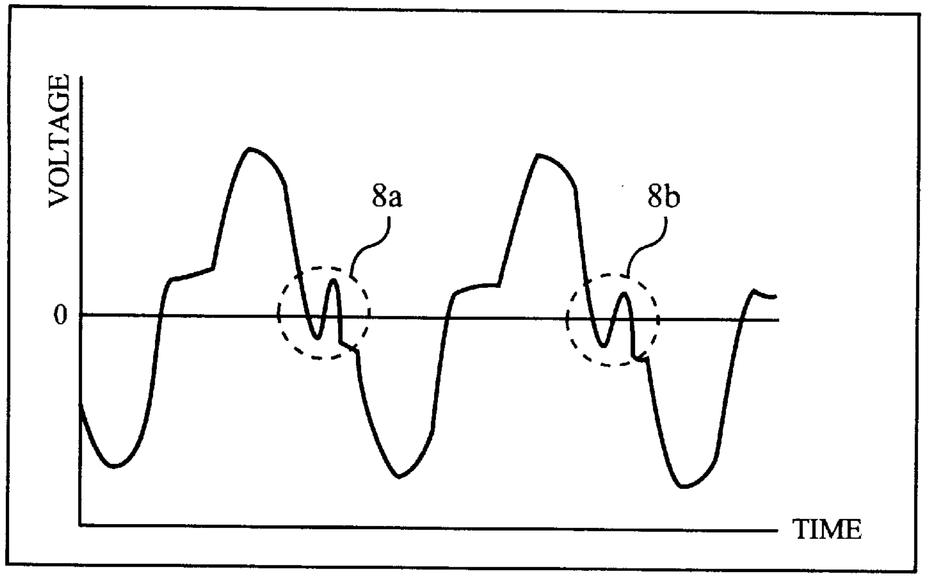
FIG. 1 (PRIOR ART)
FIG. 1 illustrates distortion in a power cycle of a switched AC power supply for an optical assembly of a traffic light system.
Figure 2:
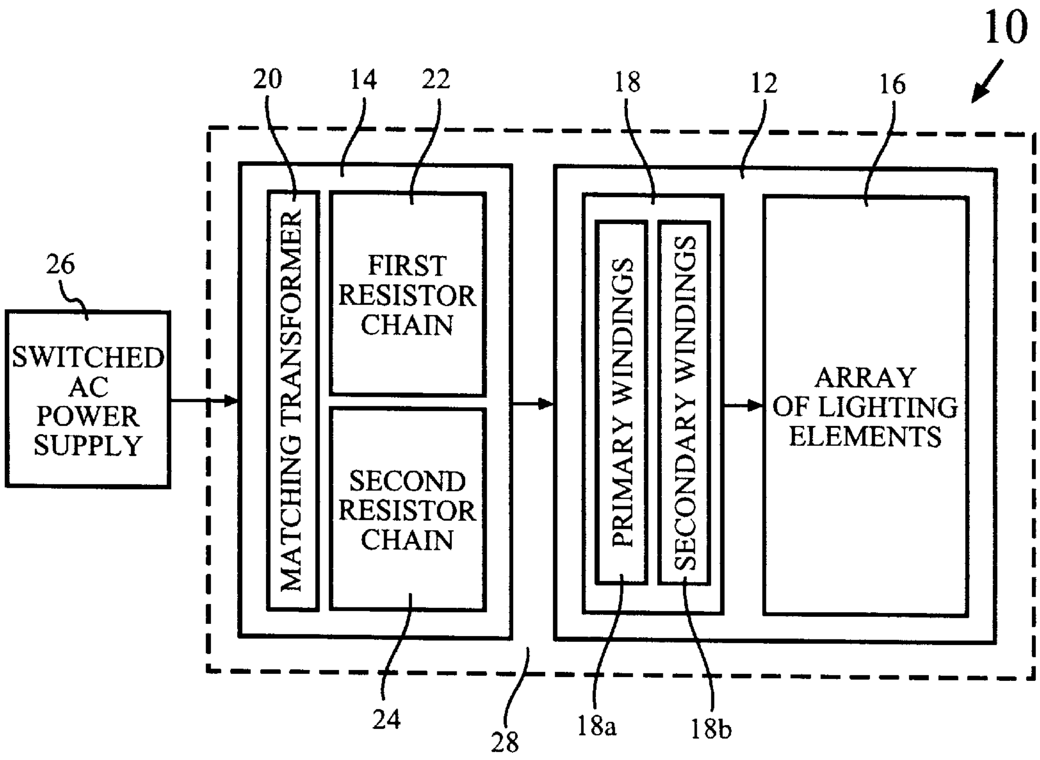
FIG. 2 is a general block diagram of a traffic light system in accordance with a preferred embodiment of the present invention.

Referring now to FIG. 2, a general block diagram of a traffic light system 10 in accordance with a preferred embodiment of the present invention is illustrated. The traffic light system 10 comprises at least one optical assembly 12 and at least one impedance matching circuit 14. Each of the impedance matching circuit 14 is respectively and electrically coupled to each of the optical assembly 12.

The optical assembly 12 comprises a plurality of electronic lighting elements, arranged in an array 16, and an input transformer 18. The electronic lighting elements can be, for example, light emitting diodes (LEDs). The input transformer 18 has primary windings 18*a* and secondary windings 18*b*. The secondary windings 18*b* are electrically coupled to the electronic lighting elements of the array 16.

The impedance matching circuit 14 comprises at least one matching transformer 20, a first resistor chain 22 and a second resistor chain 24. An alternating current (AC) switched power supply 26 is coupled in parallel to the matching transformer 20 of the impedance matching circuit 14.

Figure 3:
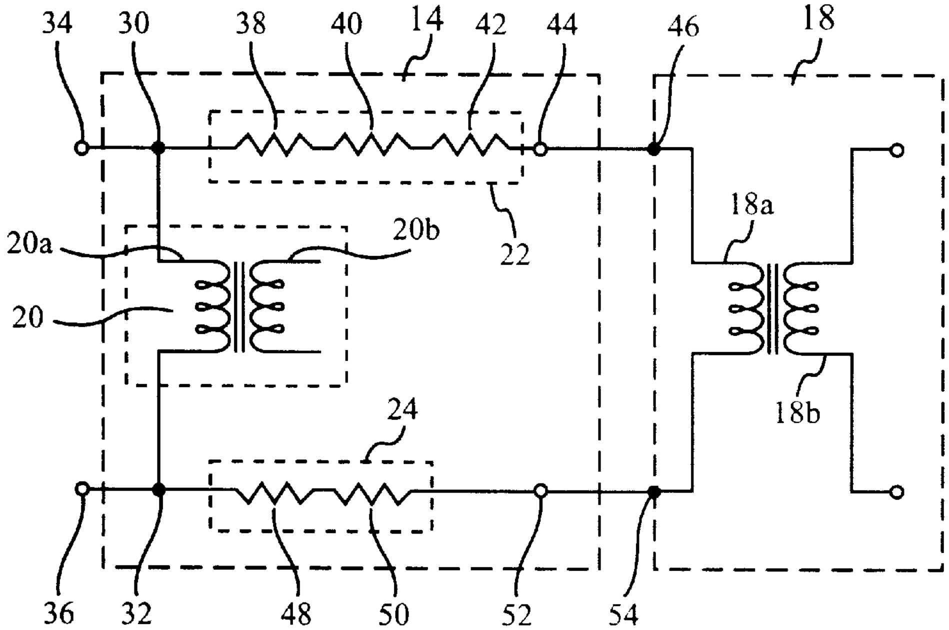
FIG. 3 is a circuit schematic illustrating electrical coupling between an impedance matching circuit and an input transformer of the traffic light system of FIG. 2.

Details of the electrical coupling between the impedance matching circuit 14 and the input transformer 18 are illustrated with FIG. 3. The matching transformer 20 has primary windings 20*a* and secondary windings 20*b*. The primary windings 20*a* are electrically coupled in parallel with the switched AC power supply 26 via two electrical nodes 30,32. These two electrical nodes 30,32 are common with inputs 34,36 of the first resistor chain 22 and the second resistor chain 24, respectively.

The first resistor chain 22 has three resistors 38,40,42 connected in series. An output 44 of the first resistor chain 22 is common with a supply node 46 of the primary windings 18*a*. The second resistor chain 24 has three two resistors 48,50 connected in series. An output 52 of the second resistor chain 24 is common with another supply node 54 of the primary windings 18*a*.

In operation, the matching transformer 20 absorbs or sinks the return AC power cycle that is reflected from the input transformer 18. At the same time, the inductive impedance looking at the optical assembly 12 is reduced as a result of the matching transformer 20 being in parallel with the input transformer 18.

Referring back to FIG. 2, it is to be noted that the preferred embodiment describes the impedance matching circuit 14 and the optical assembly 12 as separate element blocks. An alternate preferred embodiment of the present invention provides an optical assembly 28 having the impedance matching circuit 14 and elements of the optical assembly 12 being combined as a single block.

The electrical couplings between the impedance matching circuit 14 and the input transformer 18 or the switched AC power supply 26 remains unchanged and as described in the above.

For both preferred embodiments, the input transformer 18 or the matching transformer 20 can be toroidal transformers. It is also to be noted that the resistors 38,40 42 48 50 are negative temperature co-efficient (NTC) resistors. These NTC resistors 38,40,42,48,50 limit the current between the switched AC power supply 26 and the optical assembly 12.

Figure 4:
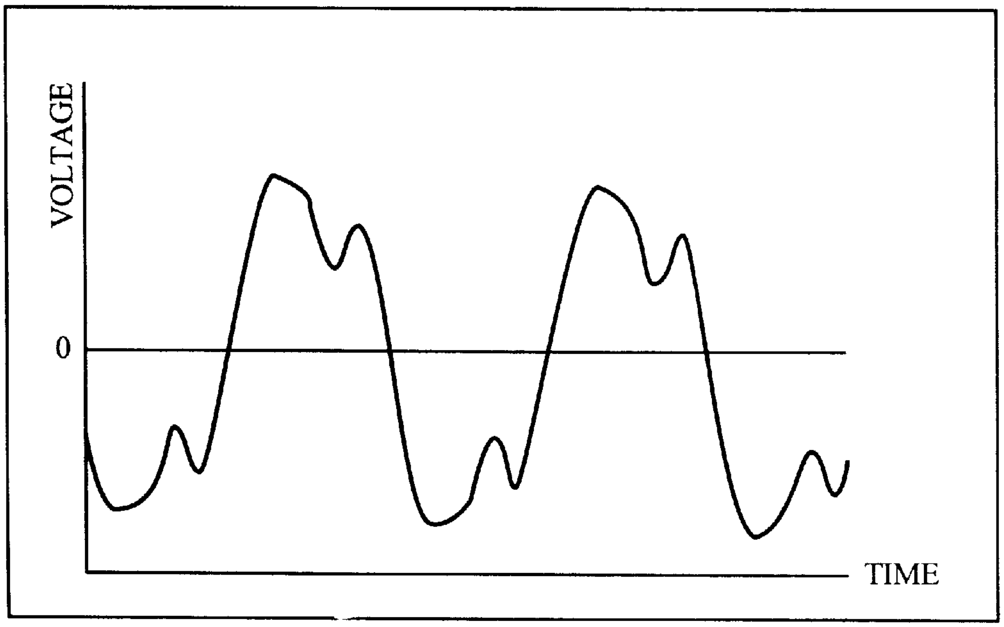
FIG. 4 illustrates a power cycle of a switched AC power supply for the traffic light system of FIG. 2.

FIG. 4 illustrates a power cycle of the switched AC power supply 26 for the traffic light system 10. The waveform of the power cycle is more symmetrical about the x-axis and, therefore, does not have a substantial net DC component seen in existing triac switched AC power supplies having power cycle distortion. Consequently, components of the optical assemblies 12,28 of the preferred embodiments are less likely to be damaged. In particular, AC components such as the input transformer 18 are not likely to receive substantial net DC component from power cycles of the switched AC power supply 26.

It is to be noted that each of the impedance matching circuit 14 can be electrically coupled to one or more of the optical assembly 12. Optionally, more than one impedance matching circuit 14 can be electrically coupled to each optical assembly 12.

The present invention therefore provides an impedance matching circuit 14, optical assemblies 12,28 having the impedance matching circuit 14 and a traffic light system 10 that comprises at least one of the optical assemblies 12,28 in accordance with preferred embodiments of the invention. Accordingly, the preferred embodiments enable existing traffic light systems having either electronic or electrical lighting elements to operate more reliably with different types of switched AC power supplies including triac switched AC power supplies.

What is claimed is:

1. An impedance matching circuit for matching a switched alternating-current (AC) power supply to an optical assembly, said impedance matching circuit comprising:

at least one matching transformer electrically coupled to said switched AC power supply;

a first resistor chain comprising at least one resistor connected in series and having an input and an output, said input being common with an electrical node of said matching transformer, said output being common with a supply node of said optical assembly; and a second resistor chain comprising at least one resistor connected in series and having an input and an output, said input being common with another electrical node of said matching transformer, said output being common with another supply node of said optical assembly.

2. The impedance matching circuit as claimed in claim 1, wherein each of said matching transformer includes primary windings, said primary windings being electrically coupled in parallel with said switched AC power supply.

3. The impedance matching circuit as claimed in claim 2, wherein said primary windings provide said electrical nodes.

4. The impedance matching circuit as claimed in claim 1, wherein each of said matching transformer comprises a toroidal transformer.

5. The impedance matching circuit as claimed in claim 1, wherein said at least one resistor of said first and second resistor chains comprises negative temperature co-efficient resistors.

6. An optical assembly for traffic light signaling, said optical assembly comprising:

a plurality of lighting elements;

an input transformer having primary windings and secondary windings, said secondary windings being electrically coupled to said plurality of lighting elements; and an impedance matching circuit electrically coupled to said input transformer, said impedance matching circuit comprising:

at least one matching transformer;

a first resistor chain comprising at least one resistor connected in series and having an input and an output, said input being common with an electrical node of said matching transformer, said output being common with a supply node of said primary windings; and a second resistor chain comprising at least one resistor connected in series and having an input and an output, said input being common with another electrical node of said matching transformer, said output being common with another supply node of said primary windings.

7. The optical assembly as claimed in claim 6, wherein each of said matching transformer includes primary windings, said primary windings being electrically coupled in parallel with a switched AC power supply.

8. The optical assembly as claimed in claim 7, wherein said primary windings of said matching transformer provide said electrical nodes.

9. The optical assembly as claimed in claim 6, wherein each of said matching transformer comprises a toroidal transformer.

10. The optical assembly as claimed in claim 6, wherein said at least one resistor of said first and second resistor chains comprises negative temperature co-efficient resistors.

11. The optical assembly as claimed in claim 6, wherein each of said plurality of lighting elements is a light emitting diode.

12. A traffic light system to provide traffic light signals, said traffic light system comprising:

at least one optical assembly comprising:

a plurality of lighting elements; and an input transformer having primary windings and secondary windings, said secondary windings being electrically coupled to said plurality of lighting elements; and at least one impedance matching circuit electrically coupled to said optical assembly, each of said impedance matching circuit comprising:

at least one matching transformer;

a first resistor chain comprising at least one resistor connected in series and having an input and an output, said input being common with an electrical node of said matching transformer, said output being common with a supply node of said primary windings; and a second resistor chain comprising at least one resistor connected in series and having an input and an output, said input being common with another electrical node of said matching transformer, said output being common with another supply node of said primary windings.

13. The traffic light system as claimed in claim 12, wherein each of said matching transformer includes primary windings, said primary windings being electrically coupled in parallel with a switched AC power supply.

14. The traffic light system as claimed in claim 13, wherein said primary windings of said matching transformer provide said electrical nodes.

15. The traffic light system as claimed in claim 12, wherein each of said matching transformer comprises a toroidal transformer.

16. The traffic light system as claimed in claim 12, wherein said at least one resistor of said first and second resistor chains comprises negative temperature co-efficient resistors.

17. The traffic light system as claimed in claim 12, wherein each of said plurality of lighting elements is a light emitting diode.

* * * * *